(12) United States Patent
Allen et al.

(10) Patent No.: US 11,891,041 B2
(45) Date of Patent: Feb. 6, 2024

(54) AMPHIBIOUS AIR-CUSHION VEHICLE WITH DUAL-RAIL CARGO SYSTEM

(71) Applicant: Textron Innovations Inc., Providence, RI (US)

(72) Inventors: Frank Scott Allen, North Richland Hills, TX (US); William Keith DuBose, Penascola, FL (US)

(73) Assignee: Textron Innovations Inc., Providence, RI (US)

( * ) Notice: Subject to any disclaimer, the term of this patent is extended or adjusted under 35 U.S.C. 154(b) by 350 days.

(21) Appl. No.: 16/983,461

(22) Filed: Aug. 3, 2020

(65) Prior Publication Data

US 2021/0031744 A1     Feb. 4, 2021

Related U.S. Application Data

(60) Provisional application No. 62/882,009, filed on Aug. 2, 2019.

(51) Int. Cl.
    *B60V 1/18*             (2006.01)
    *B60V 1/04*             (2006.01)
    (Continued)

(52) U.S. Cl.
    CPC ................. *B60V 1/18* (2013.01); *B60V 1/04* (2013.01); *B60V 1/14* (2013.01); *B63B 25/22* (2013.01);
    (Continued)

(58) Field of Classification Search
    CPC .. B60P 1/43; B60P 1/52; B60P 1/6427; B60P 1/6454; B60P 1/649; B60P 7/0815;
    (Continued)

(56) References Cited

U.S. PATENT DOCUMENTS 3,251,489 A     5/1966    Davidson
3,483,838 A *   12/1969   Rath ..................... B63H 25/42
                                                             114/260
(Continued)

FOREIGN PATENT DOCUMENTS

CN        106379481 A *   2/2017            B63B 1/121
CN        106379481 A     2/2017
(Continued)

OTHER PUBLICATIONS

Aronson, Robert B., "Birth of the 100-Knot Navy", Machine Design, vol. 45, May 31, 1973.

*Primary Examiner* — James Keenan
(74) *Attorney, Agent, or Firm* — BainwoodHuang

(57) ABSTRACT

An amphibious air cushion vehicle includes an air cushion supported hull configured for travel on water and smooth land; a deck supported by the hull; and a dual-rail cargo system having tracks arranged longitudinally on along the hull cargo deck from an aft end. The tracks include (1) guide rails and rollers providing for guided sliding movement of palletized cargo along the tracks, and (2) locks for locking pallets in position during transport, The track is configured at the aft end for an unloading operation in which the locks are disengaged and the palletized cargo slides off the aft end onto underlying land as the vehicle is moving forward thereon. The track may be the one track of a single-track variant, or one of a pair of tracks in a two-track variant.

13 Claims, 8 Drawing Sheets

(51) Int. Cl.
*B60V 1/14* (2006.01)
*B63B 27/14* (2006.01)
*B63B 25/22* (2006.01)
*B63B 25/28* (2006.01)
*B60V 1/16* (2006.01)
*B63B 35/00* (2020.01)
*B60P 1/43* (2006.01)
*B60P 1/52* (2006.01)
*B60P 7/08* (2006.01)

(52) U.S. Cl.
CPC ............ *B63B 25/28* (2013.01); *B63B 27/143* (2013.01); *B60P 1/43* (2013.01); *B60P 1/52* (2013.01); *B60P 7/0815* (2013.01); *B60V 1/16* (2013.01); *B63B 2025/285* (2013.01); *B63B 2035/001* (2013.01)

(58) Field of Classification Search
CPC .. B60V 1/00; B60V 1/04; B60V 1/043; B60V 1/11; B60V 1/14; B60V 1/16; B60V 1/18; B60V 3/06; B63B 25/22; B63B 25/28; B63B 2025/285; B63B 27/143; B63B 2035/001
See application file for complete search history.

(56) References Cited

U.S. PATENT DOCUMENTS

| | | | |
|---|---|---|---|
| 3,817,199 A * | 6/1974 | Schirtzinger | B63B 27/143 114/61.12 |
| 3,899,092 A * | 8/1975 | Nordstrom | B60P 1/52 414/535 |
| 5,000,634 A * | 3/1991 | Ducote | B63B 25/28 410/84 |
| 5,307,893 A * | 5/1994 | Bender | B60V 1/14 180/117 |
| 5,708,230 A * | 1/1998 | Woodall, Jr. | B60V 1/043 89/1.13 |
| 5,951,607 A * | 9/1999 | Senn | G05D 1/0206 701/16 |
| 6,082,266 A * | 7/2000 | Auzins | B63G 6/00 102/411 |
| 6,817,578 B1 | 11/2004 | Garcia et al. | |
| 7,168,382 B2 * | 1/2007 | Burg | B63B 35/00 180/126 |
| 7,685,953 B2 | 3/2010 | Giles | |
| 8,690,103 B2 | 4/2014 | Schulze et al. | |
| 8,943,980 B2 | 2/2015 | Moberg | |
| 9,079,665 B2 | 7/2015 | Larson et al. | |
| 9,242,730 B2 | 1/2016 | Larson et al. | |
| 9,630,545 B1 * | 4/2017 | Corrigan | B60P 1/44 |
| 9,694,978 B2 | 7/2017 | Harms et al. | |
| 9,738,372 B2 | 8/2017 | Barmichev et al. | |
| 10,059,450 B2 | 8/2018 | Levron | |
| 10,787,260 B2 | 9/2020 | Scheer et al. | |
| 10,814,982 B2 | 10/2020 | Brown et al. | |
| 10,960,806 B1 * | 3/2021 | Sovel | B63B 27/143 |
| 2002/0134290 A1 * | 9/2002 | Armour | B63B 35/54 114/72 |
| 2004/0247422 A1 * | 12/2004 | Neumann | B65D 88/14 193/35 R |
| 2007/0151499 A1 * | 7/2007 | Maloney | B63B 35/42 114/259 |

FOREIGN PATENT DOCUMENTS

| | | | |
|---|---|---|---|
| EP | 1473247 | 6/2005 | |
| FR | 2805518 A1 * | 8/2001 | ............... B63B 1/12 |
| GB | 1079362 | 8/1967 | |
| GB | 2509358 A * | 7/2014 | ............ B63B 1/121 |
| GB | 2509358 A | 7/2014 | |
| SU | 1087065 A3 * | 4/1984 | ............... B60V 1/18 |
| WO | WO-2017042757 A1 * | 3/2017 | ............... B60V 1/04 |

* cited by examiner

AMPHIBIOUS AIR-CUSHION VEHICLE WITH DUAL-RAIL CARGO SYSTEM

BACKGROUND

The present invention is related to the field of amphibious vehicles used for carrying and delivery of cargo.

SUMMARY

An air cushion vehicle (ACV) having a hull, a deck, a propulsion system providing vertical lift and horizontal thrust, and a dual-rail cargo system on the deck, configured and operative to receive and discharge palletized and/or containerized cargo at either/both the bow and stern of the vehicle. The dual-rail cargo system may be an integral part of a specialized ACV, or alternatively it may be deployed as an add-on to ACVs that also have other uses. In one example, the dual-rail cargo system may be incorporated as an add-on to the so-called Ship-to-Shore Connector (SSC) sold by Textron System Corporation, which is an ACV capable of carrying 74 short tons. Such an add-on use can support missions that require rapid buildup of supplies to support beach logistics during amphibious landings. The descriptions herein are not specific to SSC, but the deployment of a dual-rail cargo system on an ACV can apply to SSC or other craft such as Landing Craft Air Cushion (LCAC) for example.

In one embodiment the ACV has an overall length (on cushion) of approximately 100 ft., a beam (on cushion) of approximately 44 ft., and an above-water height of approximately 22 ft. The craft features a large open cargo deck including a dual-rail cargo system, which may be similar to that used on the C130 military transport plane. Also on deck are propulsion and lift machinery along each side. In one embodiment, hull or buoyancy box depth is approximately 5 ft., and cushion height is 5 ft.

In one embodiment, propulsion is by two ducted propellers and lift air by centrifugal fans. Propulsion and lift power is provided by two gas turbines, each driving a lift fan impeller and a propeller assembly through a combining drive line. Craft speed and directional control is accomplished with variable pitch propellers, rudders aft of the propellers, and thrust ports on the fans.

The craft dimensions may allow for well deck compatibility for US Navy (USN) assault ships, while the gas turbine power allows for significant payloads of up to 40 short tons.

The craft control system is preferably fly by wire with an integrated flight controls (IFC) automatically coordinating the propeller pitch, rudder positions and thrusters to achieve the commanded maneuvers. The IFC may allow for either manned and unmanned control.

A bow ramp may allow wheeled and tracked vehicles to roll on and off, while the dual rail system allows palletized cargo to be discharged across a stern ramp with the craft underway.

Advantageous function and flexibility are provided by the combination of rapid discharge of standardized cargo pallets with the versatile amphibious capability of a gas turbine powered, well deck compatible ACV.

ACV technology allows for rapid cargo transport onto remote, unimproved coast lines, inaccessible to conventional landing craft. Using a powerful over 30 ton payload capable ACV platform, the vessel can transverse deep water, shallows, and reefs, and may drive onto over 70% of the worlds beaches.

Once at a remote beach, the dual rail system enables the craft to rapidly discharge the cargo, without the need for support equipment—cranes, fork lifts or other cargo handling assets. To discharge the pallets, the craft remains on-cushion and moves forward over the beach, while the palletized cargo is released and rolls off the stern over a stern ramp extended clear over the ACV skirt system.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
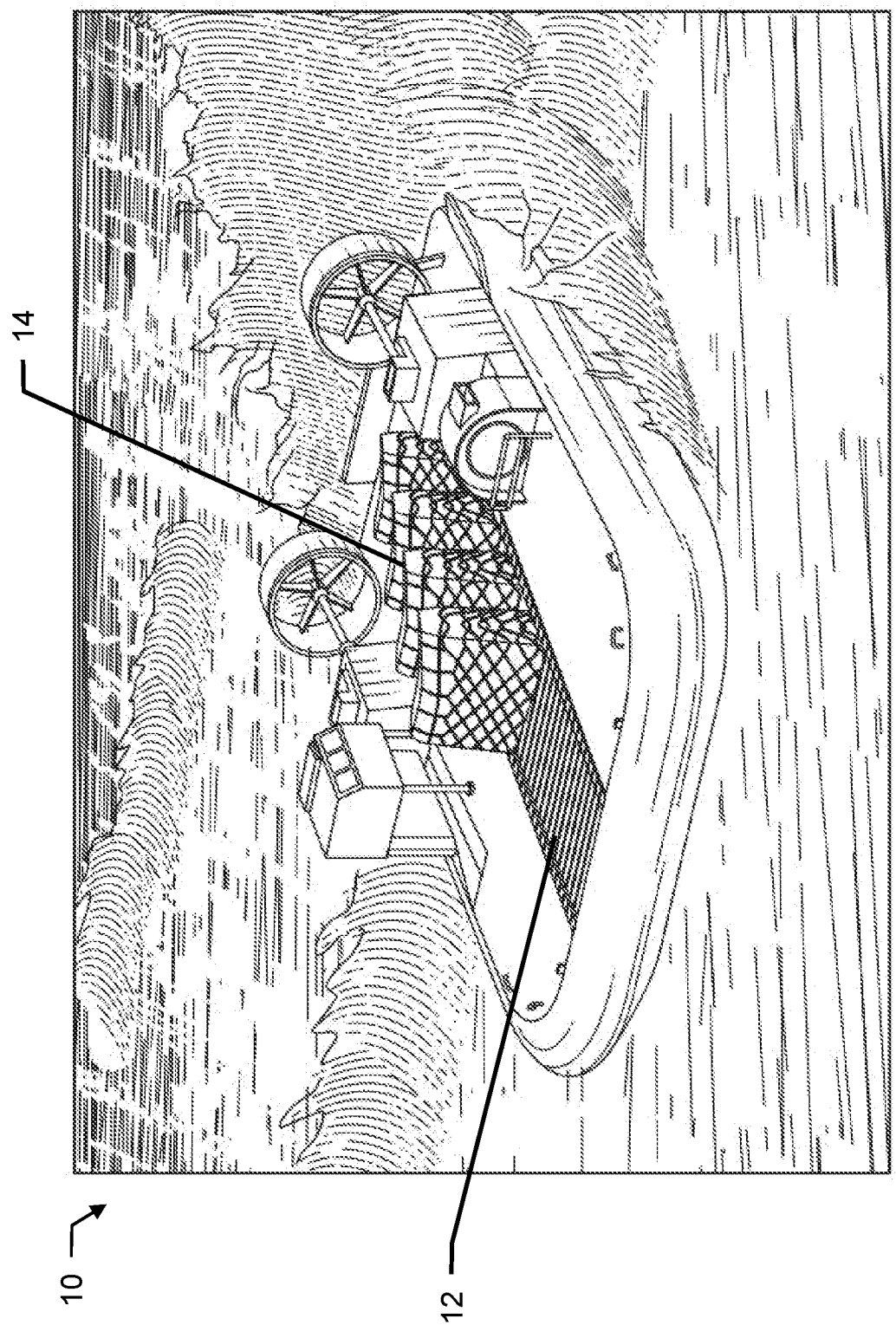
FIG. 1 is an image view of an amphibious air-cushion vehicle (ACV)

FIG. 1 shows an amphibious air-cushioned vehicle (ACV) 10. Among other features as described more below, it includes a dual-rail cargo system 12 located centrally and extending fore-aft on the deck. In use, the dual-rail cargo system 12 is used to palletized ferry cargo 14 to a beach or similar landing location accessible to the ACV 10 from the water. As described further herein, the palletized cargo 14 can be unloaded very quickly by being allowed to slide rearward along the dual-rail cargo system 12 to an aft end while the ACV 10 moves forward over the landing location, dropping the cargo 14 from the aft end. Once all cargo 14 is dropped, the ACV 12 can quickly move back out to the water. This operation may be performed a large number of times to enable the delivery of a large quantity of material into the landing location.

Figure 2:
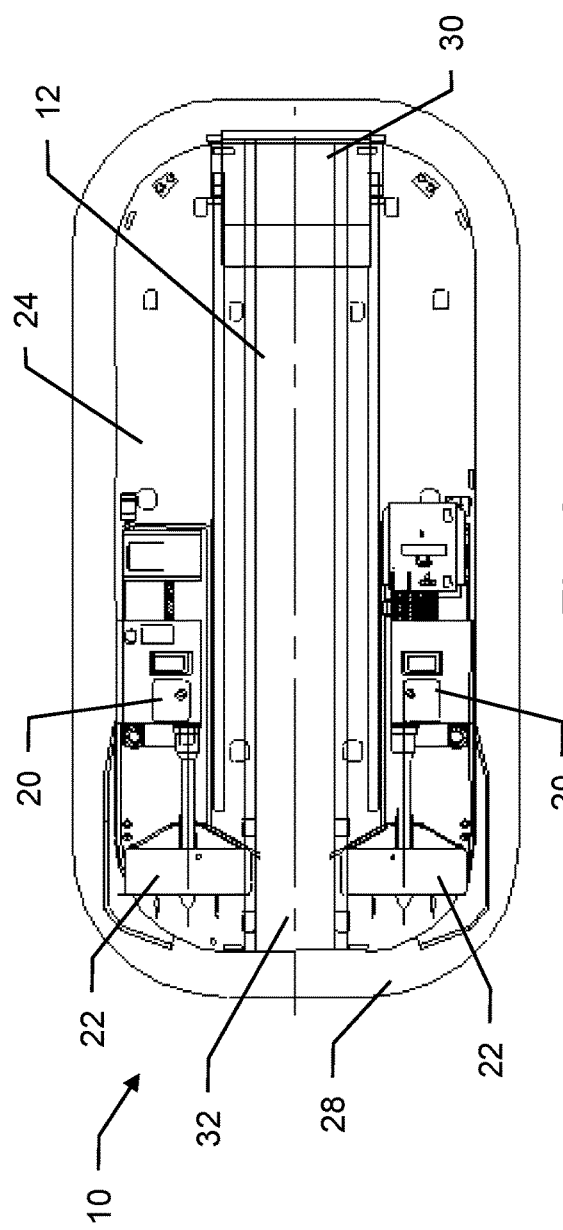
FIG. 2 is a simplified plan view of the ACV.
Figure 3:
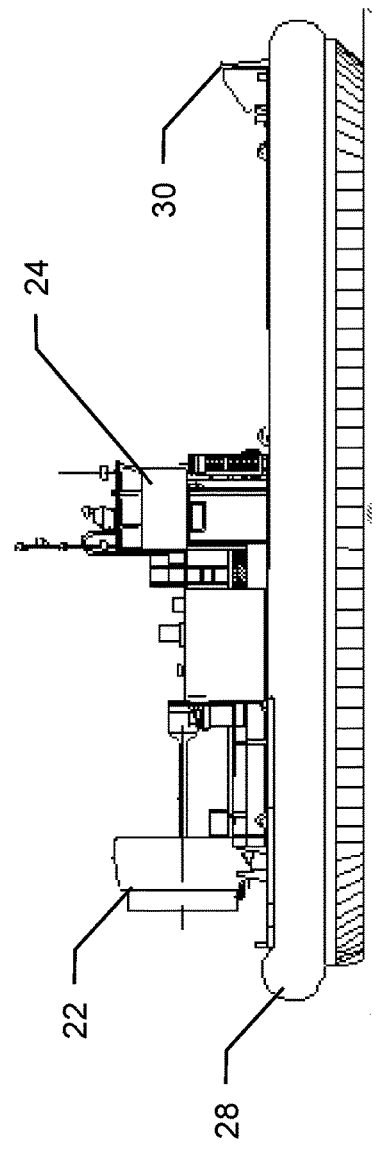
FIG. 3 is a simplified elevation view of the ACV.

FIGS. 2 and 3 illustrate features of the ACV 10 in additional detail. It includes a pair of gas turbines 20 providing operating power, in particular each driving a respective propeller 22 which provides thrust during operation. Use of a single gas turbine 20 per side can provide for a simplified driveline, for example avoiding a need for a combining gearbox and overrunning clutches. A control unit 24 preferably employs so-called "fly-by-wire controls" and may enable both manned and unmanned operation of the ACV 10. The dual-rail cargo system 12 is an automated cargo delivery system based on one or more dual rail tracks and use of standardized pallets, such as HCU-6/E standardized pallets as used on the C130 cargo handling system. It may include open deck space 26 usable for either/both roll-on/roll-off (Ro-Ro) loading or crane loading, or for carrying personnel modules for example. The hull 28 preferably has a simplified structural design with continuous transverse bulkheads and no curtain plates. A bow ramp 30 can support Ro-Ro loading and unloading, and a stern ramp 32 along with a bob-tailed skirt design support palletized cargo drops as described herein.

As mentioned, the ACV 10 is preferably fully amphibious and of a size and construction enabling it to provide logistics support for desired payload size and traveling speed, which in one embodiment may be on the order of up to 30 tons and 35 knots respectively. It may be designed for either manned or unmanned operation. For certain military applications including a scenario of dropping cargo into a hostile landing area. it is preferably capable of performing a high-speed offload of all cargo 14 in an interval as short as 1-2 minutes.

The pallets used with the ACV 10 may be of a known variety having a metal sandwich-type construction and used for palletizing and transporting cargo on roller type conveyors. As in an aircraft, the dual-rail system 12 includes such roller type conveyors as well as restraint rails that guide the pallets and constrain them to move only fore and aft, for loading and unloading. The pallets are used with a locking arrangement for locking the pallet into the dual rail system for restraint during travel, as well as tie-down rings to secure the cargo to each pallet. A standard pallet has dimensions of 88 inches long by 108 inches wide by 2¼ inches thick, and has a maximum load capacity of 10,000 pounds.

Figure 4:
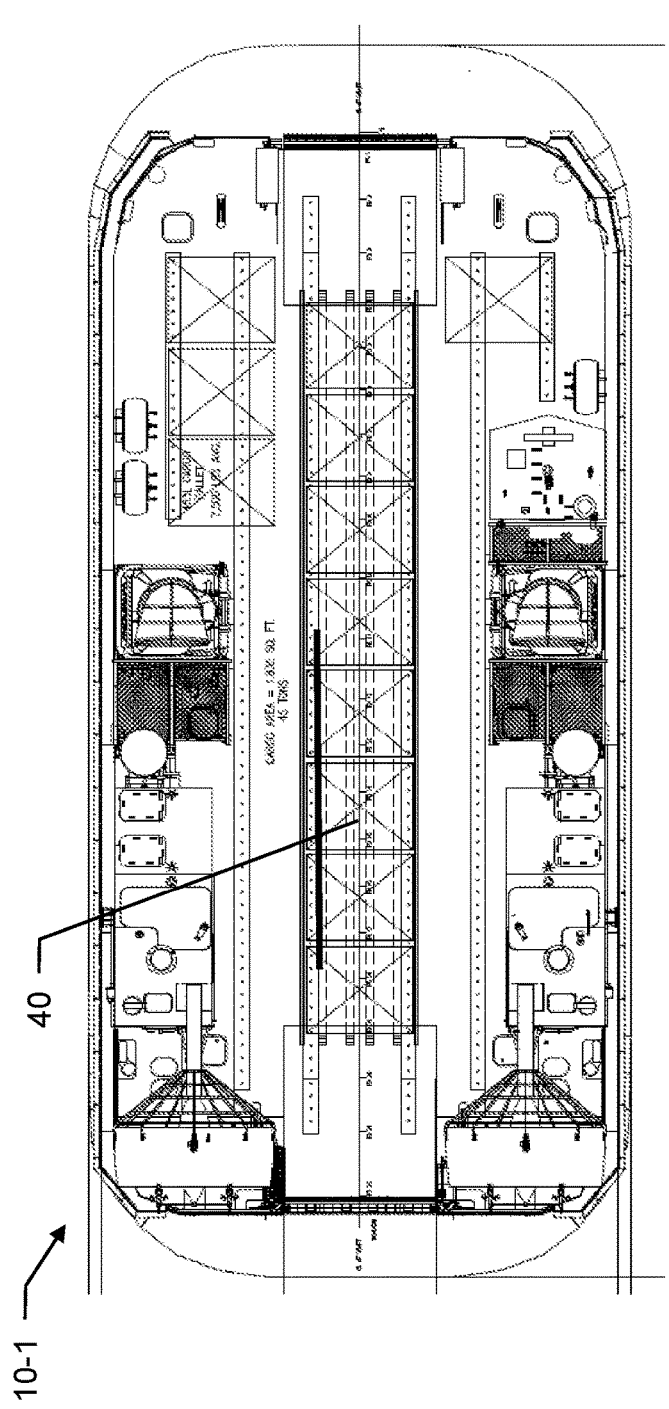
FIG. 4 is a more detailed plan view of the ACV.
Figure 5:
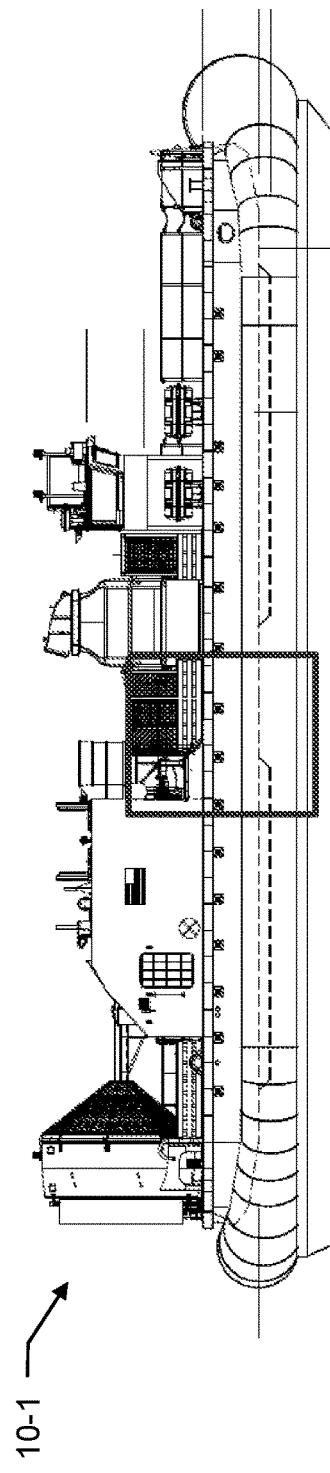
FIG. 5 is a more detailed elevation view of the ACV.

FIGS. 4 and 5 show additional details of a first ACV embodiment 10-1. Specifically, this embodiment employs a single-track dual-rail system in which the pallets 40 are oriented transversely (long side extending across the rails) as shown.

Figure 6:
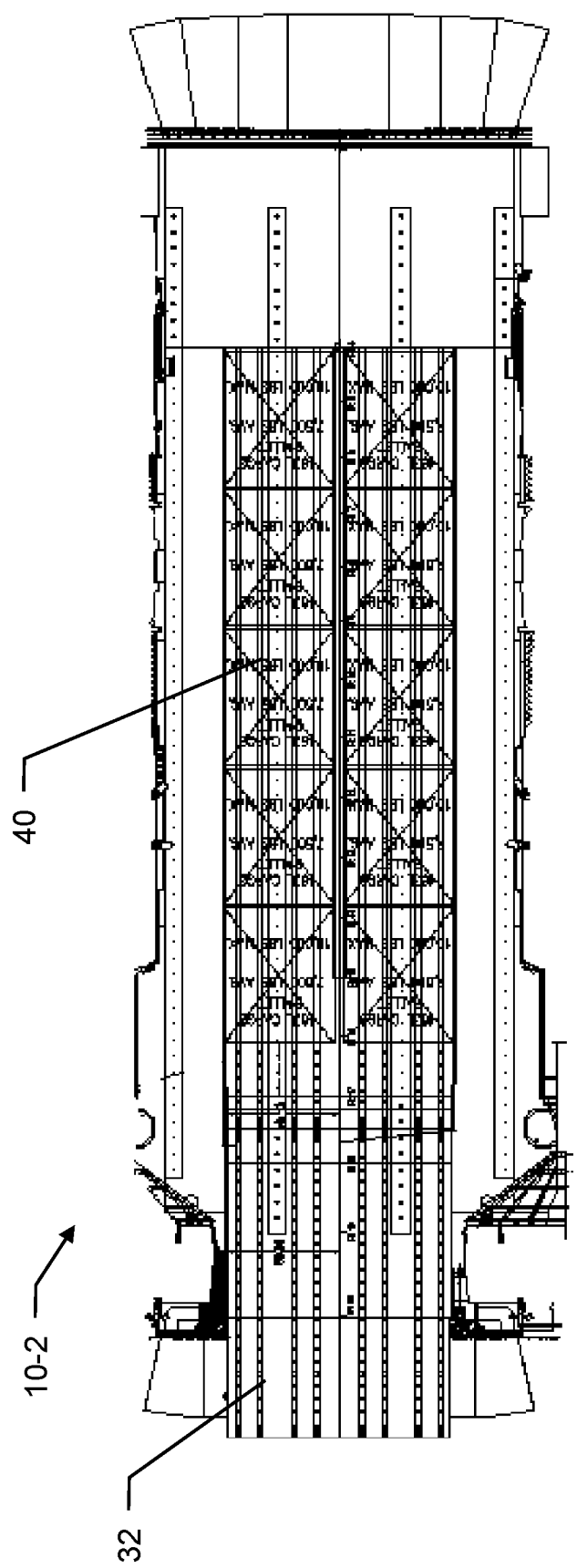
FIG. 6 is a plan view of an alternative dual-rail system employing two parallel tracks.

FIG. 6 is a view of just the dual-rail system portion of an alternative embodiment 10-2 that employs two parallel tracks with the pallets 40 rotated so that their narrower dimension is across the respective track. In this embodiment, up to ten pallets 40 may be accommodated as shown. This arrangement may avoid any need for omnidirectional rollers in the tracks. In this example, each track extends off the stern ramp 32 so that two pallets 40 (one from each track) are dropped simultaneously during unloading. An alternative arrangement may be used in the stern ramp 32 has only one track for discharge, and a funneling or switching arrangement is used to move pallets 40 from each track 12 onto the single discharge track.

Figure 7:
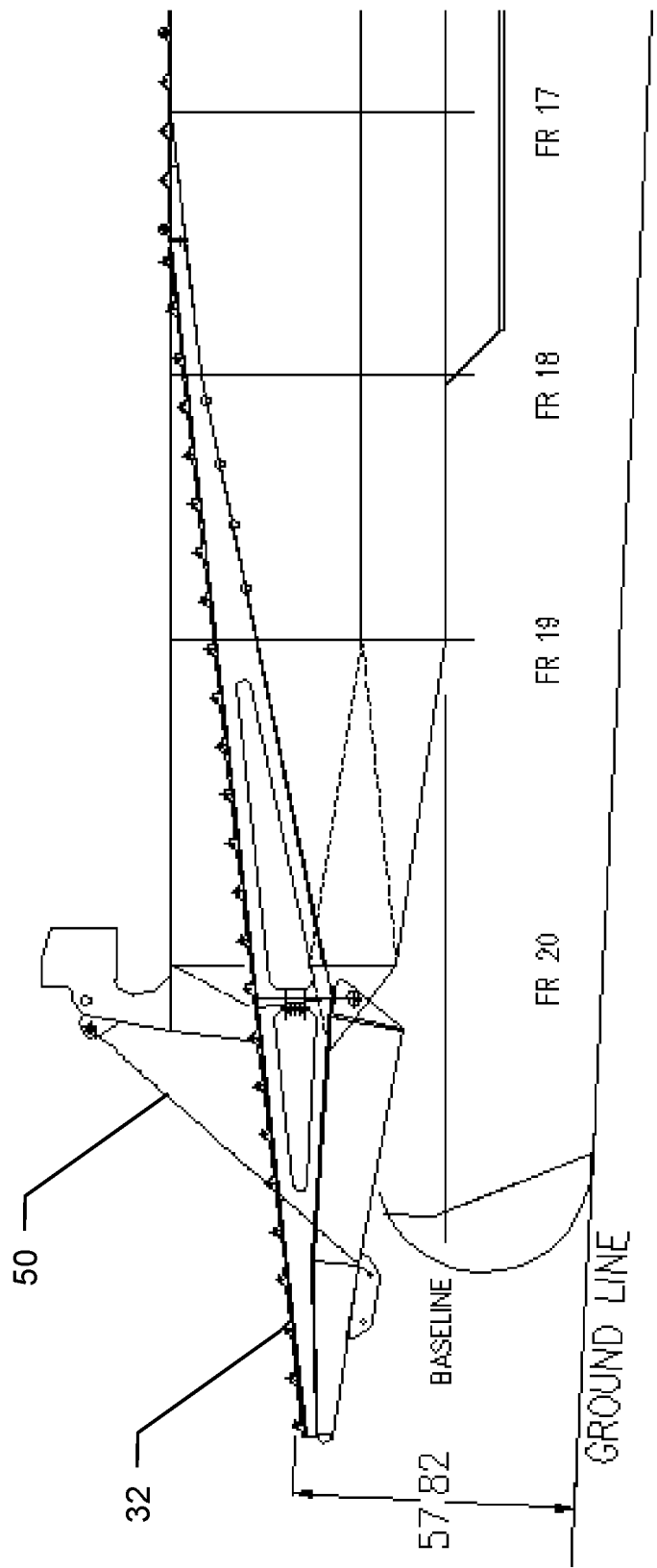
FIG. 7 is a partial elevation view of an area of a stern ramp alternative.

FIG. 7 shows additional detail of the area of the stern ramp 32 in one embodiment. In this case the stern ramp 32 may be an add-on, and a retention cable 50 is used to support the aft end and limit lever-type loading at the attachment point. This is one example of a fixed ramp, i.e., a ramp fixedly attached to or otherwise rigidly part of the aft end of the ACV 10. In an alternative embodiment, the stern ramp may be retractable, i.e., moveable from a retracted position when not in use to an extended position when actively being used for cargo delivery.

Figure 8:
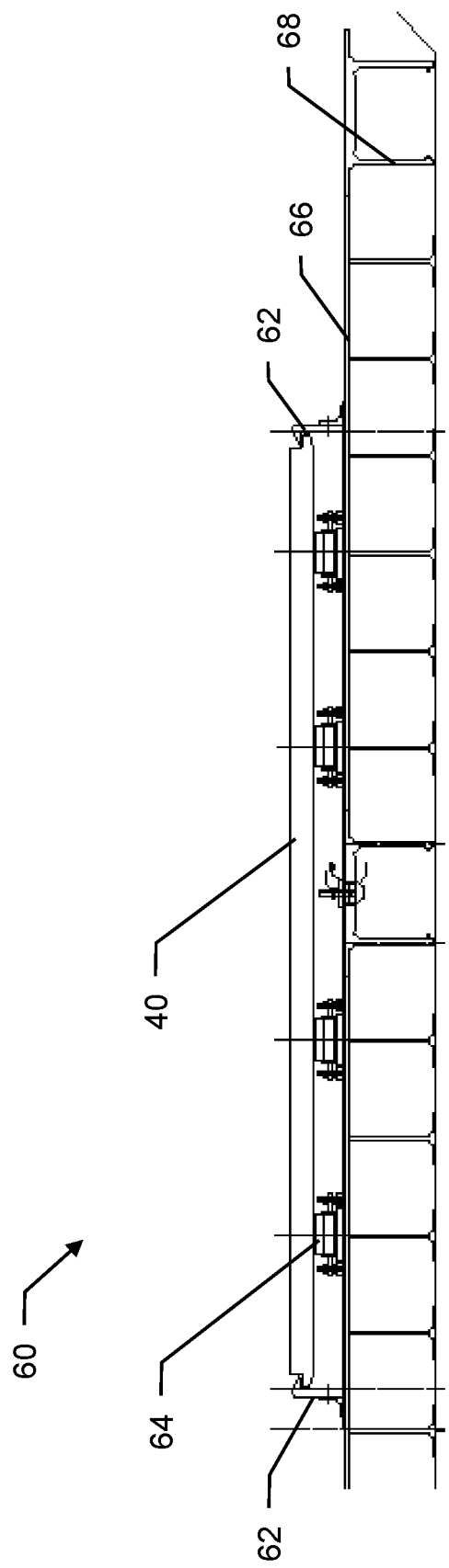
FIG. 8 is a section view across a track of a dual-rail system.

FIG. 8 shows a section view across a track 60, illustrating the rails 62, rollers 64, and a pallet 40. Also shown are the deck surface 66 and underlying vertical support ribs 68.

Figure 9:
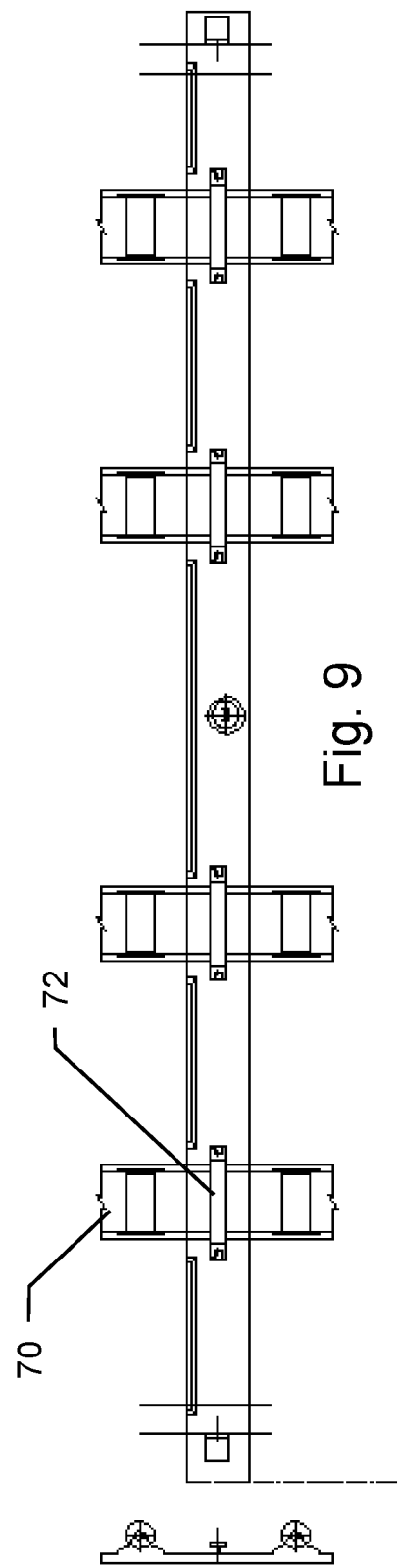
FIG. 9 is a plan view of a section of deck showing deck strapping.
Figure 10:
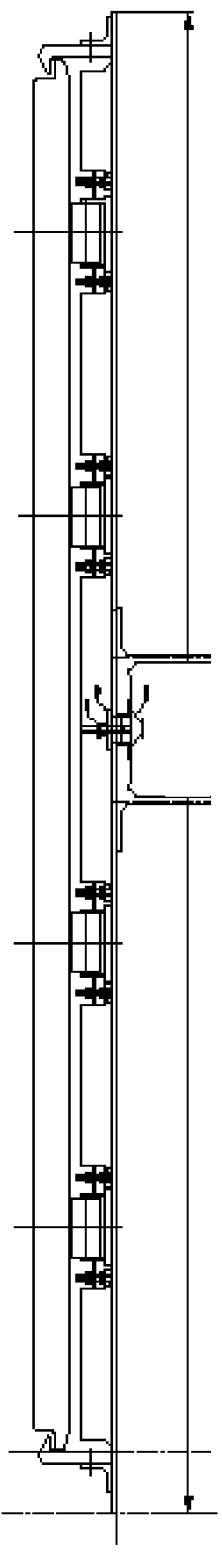
FIG. 10 is a section view of the section of deck showing deck strapping.

FIGS. 9 and 10 show details of deck strapping that may be 5 employed to secure elongated roller members 70 to the deck. As shown, the members 70 are tied or strapped down by sets of straps 72 that span the members 70 width-wise and are bolted into the deck. Also shown in FIG. 10 are the pallet locks 74 that lock the pallets 40 into place on the track.

Figure 11:
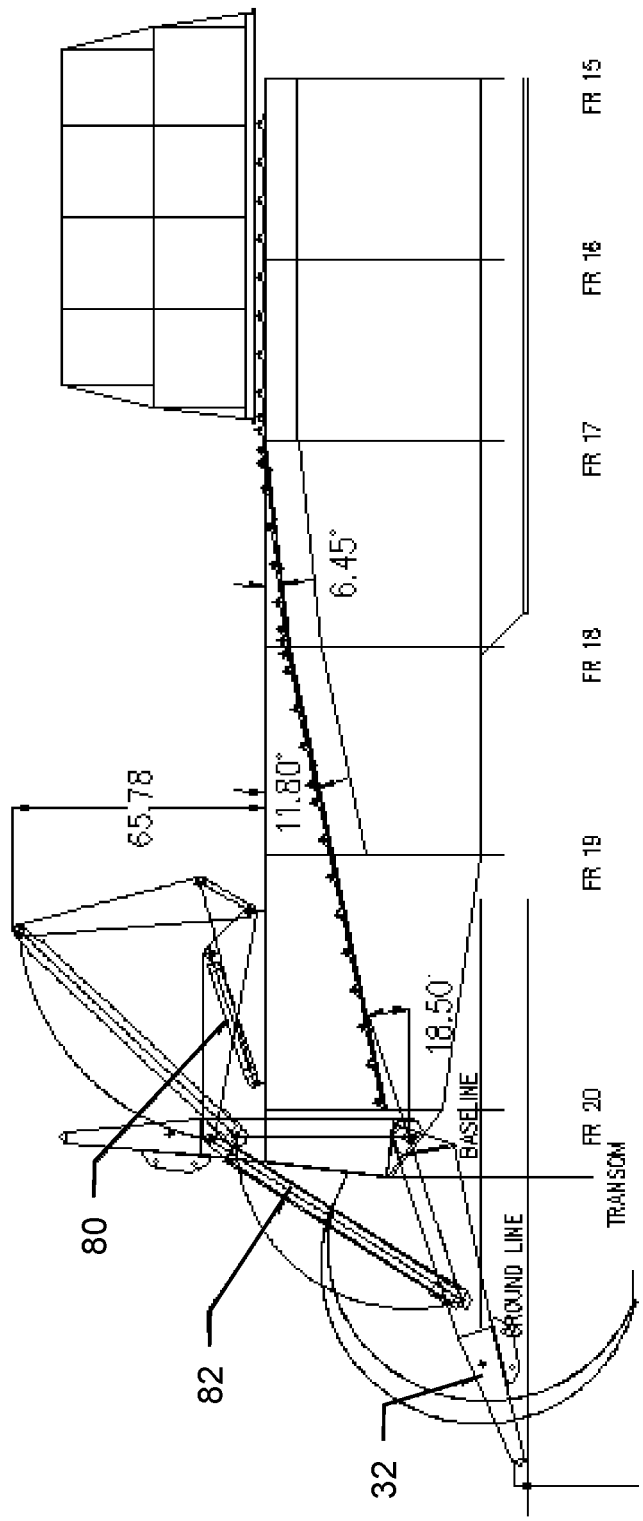
FIG. 11 is an elevation view of alternative stern ramp arrangement.

FIG. 11 shows detail of an alternative aft-end arrangement. This design uses the stern ramp 32 to help depress the cushion, employing an actuator 80 and link 82 as shown.

The following is an example operating scenario for the ACV 10 for delivery of a single load of cargo:
1. Fuel Craft
2. Load cargo in well deck or expeditionary transfer dock (ESD)
3. Startup craft and come on cushion
4. Exit well deck
5. Transit from ship to surf zone
6. Transit surf zone to the beach
7. Lower stern ramp
8. Release pallet locks
9. Initiate fast offload (e.g., 45-60 seconds to deliver 40 tons)
10. Raise ramps and come on cushion
11. Move from beach to beyond surf zone
12. Transit back to ship
13. Re-enter well deck
14. Come off cushion, and shut down machinery Below is a bulletized description of significant features of the disclosed ACV in at least some embodiments:
1) Military Amphibious Logistics Support Craft
2) 30-40 Ton cargo capacity
3) Deployable with Well-Deck Ships e.g., LPD-17, LSD 41, LSD 49 classes, LHA and ESD.
4) Cargo types: wheeled & tracked vehicles, containerized, palletized and break-bulk cargo.
5) Drive through cargo deck
6) Open cargo deck for crane loading/unloading
7) C-130 type dual rail cargo handling system for pallets
8) ACV hullform
   a) In one embodiment, 110'×45'; 22' in height
   b) Alternative lengths 110, 100, 90, and 80 ft.; beams 36, 40, 44, and 48 ft.; Payload weights 25, 35, 45, and 55 short tons
9) Manned, remote control, or full autonomous capability
10) Propulsion & Lift
   a) Prime Movers: Marine gas turbine
   b) Transmission: Mechanical (e.g., gear train)
   c) Propulsors: Ducted air propellers
   d) Lift fans: Centrifugal fans in volutes
11) Potential alternative military missions (via application-specific deck modules as required)
   a) Mine warfare—countermeasures
   b) Intelligence, Reconnaissance, Surveillance.
   c) Mobile missile defense
   d) Mobile UAV Base.
   e) Seal team deployment and recovery
   f) Army LOTS
   g) Mobile refueling platform
   h) Mothership for manned, unmanned or autonomous vehicles
12) Potential non-military missions
   a) Oil Industry support
   b) Oil spill control & recovery in coastal wetlands
     i) Shutdown and removal of abandoned wellheads in wetlands
     ii) Support of drilling operations in wetland areas
     iii) Support of well re-work in wetland areas
   b) Remote/rugged area operations
     i) Freight delivery
     ii) Mail delivery
     iii) Personnel transport
     iv) Search & Rescue
     v) Ice breaking While various embodiments of the invention have been particularly shown and described, it will be understood by those skilled in the art that various changes in form and details may be made therein without departing from the scope of the invention as defined by the appended claims.

What is claimed is:

1. An amphibious air cushion vehicle, comprising:
an air cushion hull configured for travel on water and smooth land;
a deck supported by the hull;
an extended stern ramp that is coupled with the deck and may be level with the deck; and
a dual-rail cargo system having a longitudinally arranged track extending along the deck from an aft end of the deck, the track including (1) guide rails and rollers providing for guided sliding movement of palletized cargo along the track, and (2) locks for locking pallets in position during transport, the track being configured at the aft end for an unloading operation in which the locks are disengaged while the vehicle is moving across a predetermined landing location and the palletized cargo slides along the track and off the aft end onto underlying land as the vehicle is moving forward thereon,
wherein the track at the aft end of the deck includes a stern ramp portion coupled with the extended stern ramp, and
wherein the stern ramp portion (1) includes the guide rails and the rollers and (2) is configured to enable the palletized cargo to slide downwards along the stern ramp portion and off the extended stern ramp in the unloading operation while the vehicle is moving forward, thereby delivering the palletized cargo at the predetermined landing location.

2. The amphibious air cushion vehicle of claim 1, wherein the stern ramp is secured in part by a retention cable supporting an aft end of the stern ramp to limit loading at a point of attachment of the stern ramp to the aft end of the air cushion vehicle.

3. The amphibious air cushion vehicle of claim 1, further including:
one or more propellers for horizontal thrust; and
one or more gas turbines driving the propellers for horizontal propulsion.

4. The amphibious air cushion vehicle of claim 3, wherein the propellers are variable pitch propellers.

5. The amphibious air cushion vehicle of claim 1, having a fly-by-wire control system for controlling maneuvering of the vehicle.

6. The amphibious air cushion vehicle of claim 5, wherein the fly-by-wire control system provides for unmanned operation of the air cushion vehicle.

7. The amphibious air cushion vehicle of claim 1, further including a bow ramp configured to enable wheeled and tracked vehicles to roll on and roll off the air cushion vehicle.

8. The amphibious air cushion vehicle of claim 1, wherein the track is one of a pair of parallel tracks of the dual-rail cargo system, the tracks including respective guide rails, rollers and locks and configured for the unloading operation at the aft end.

9. The amphibious air cushion vehicle of claim 8, wherein both tracks may extend off the aft end and discharge respective palletized cargo during the unloading operation.

10. The amphibious air cushion vehicle of claim 1, wherein the stern ramp is configured to extend downward from the aft end of the deck across a peripheral air cushion of the air cushion vehicle.

11. The amphibious air cushion vehicle of claim 10, wherein the stern ramp is configured to move between a retracted position and an extended position used for the unloading operation.

12. The amphibious air cushion vehicle of claim 1, further comprising a loading area at the bow of the deck, wherein the track is configured for a loading operation in which the palletized cargo in the loading area engages with the guide rails and slides towards the aft end to enable the palletized cargo to be unloaded from the aft end in an order that the palletized cargo was loaded.

13. The amphibious air cushion vehicle of claim 1, wherein the air cushion hull is configured to switch between an off-cushion mode and an on-cushion mode; and
wherein the extended stern ramp is configured to extend towards the ground from the aft end of the deck past the air cushion hull during the unloading operation while the air cushion hull in the on-cushion mode.

* * * * *